Sept. 19, 1967   H. A. SEESSELBERG   3,343,154
GROUND INDICATOR
Filed Dec. 16, 1964
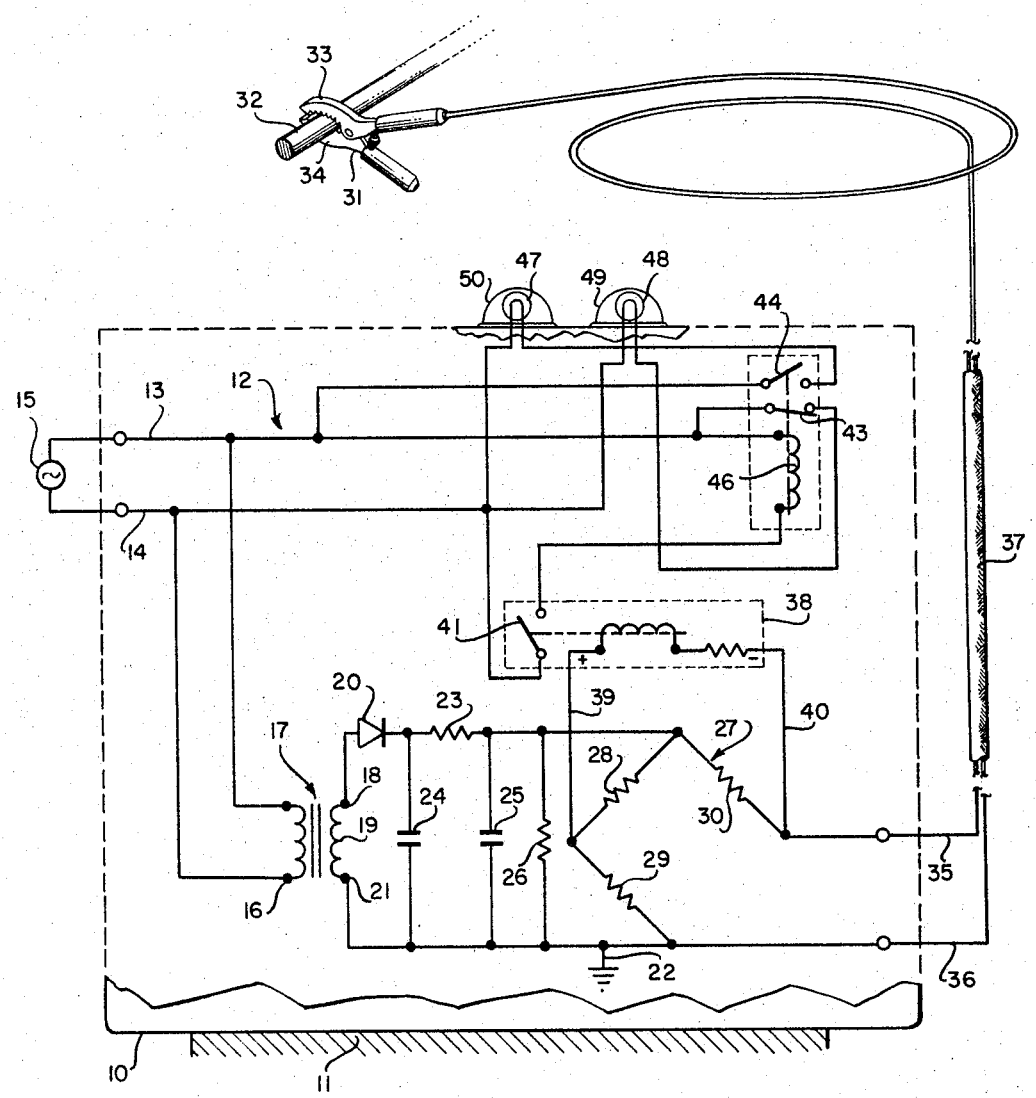
INVENTOR.
HENRY A. SEESSELBERG
BY George C. Sullivan
Agent United States Patent Office 3,343,154
Patented Sept. 19, 1967

3,343,154
GROUND INDICATOR
Henry A. Seesselberg, South Plainfield, N.J., assignor to Lockheed Aircraft Corporation, Burbank, Calif.
Filed Dec. 16, 1964, Ser. No. 418,765
6 Claims. (Cl. 340—255)

ABSTRACT OF THE DISCLOSURE

A device for establishing and indicating a low resistance electrical path to ground for dissipating any external static charge on a body in an explosive atmosphere. It consists essentially of a power source, step down transformer, a rectifier, one side of which is connected to one side of the secondary of the transformer, a Wheatstone bridge connected to the other side of the rectifier, a polarity sensitive relay control means connected across the output of the bridge, one arm of the bridge including a clamping means for attachment to the charged body, and the other side of the Wheatstone bridge connected to the other side of the secondary (which is grounded). A series circuit of secondary, rectifier and bridge exists. The sensitive relay control means is connected across the output of the Wheatstone bridge, removing it from the threshold determining circuit.

---

This invention relates generally to indicating means and more particularly to an improved device for grounding and for indicating the grounding of an electrically charged members as, for example, a tank truck which transports volatile petroleum products.

It is well known that tank truck transports entering a petroleum products loading ramp may carry a substantial electrostatic charge which, if not dissipated before the loading procedure begins, may cause a fire or explosion in the event a static discharge occurs during the loading of the products. A static charge can also be accumulated by the flow of petroleum products into the storage compartment during the loading period. If such a charge is not drained off through an electrical grounding arrangement, it may build up to a point where it will discharge to ground and result in an explosion or fire, or both.

The ground indicator of this invention is designed to perform two functions. First, it must establish a low resistance electrical path betwen a fuel truck and the loading platform ground to dissipate any external static charge on the truck during loading or unloading. Second, it must provide an indication in the form of electrical contacts that the ground path is established. The indicating electrical contacts may be used to provide a sensory signal to an operator or, if desired, to provide automatic control preventing fuel in either case from being loaded or unloaded if an inadequate grounds exists.

Since the ground indicator device is used to prevent loss of life and property damage due to explosion or fire, it must be reliable and of fail-safe design. It also must not present any hazardous condition by itself, such as contact arcing, that could ignite the explosive atmosphere in which it is used.

It is a principal object of this invention to provide an improved circuit for a ground indicator wherein the sensing relay controlling the output electrical contacts is completely removed from the ground resistance determining circuit so that its impedance does not influence the threshold point of the device. Sensitive sensing relays as are needed for high resolution are noted for their change in impedance due to age, temperature and humidity conditions. In the circuit of this invention, the threshold of indication is determined by fixed resistors which are more stable and easily controlled.

It is another object of this invention to provide a circuit for a ground indicator which is capable of operating a sensing relay at extremely low ground resistances in the order of 10–100 ohms. Sensing relays normally have impedances of several thousand ohms and could not be operated at extremely low ground resistances but for the circuit of this invention wherein the sensitive relay is coupled across the output of a Wheatstone bridge and isolated from the ground resistance threshold determining circuit.

It is another object of this invention to provide a ground indicator for measuring direct current resistance directly and requires no tuning.

It is another object of this invention to provide a ground indicator wherein the ground resistance threshold of the device does not depend on any series elements except fixed resistors. Failure of diodes, inductors, or capacitors does not present a hazardous condition at the ground clamp.

Still another object of this invention is to provide a ground indicator circuit which is relatively simple, uses standard components and may be maintained and repaired by semi-skilled personnel and operated by lay personnel.

Further and other objects will become apparent from a reading of the following description, especially when considered in combination with the accompanying drawing which is a fragmentary view of the ground indicator device of this invention showing in detail the circuitry involved.

Referring to the drawing, an explosion-proof housing 10 is suitably grounded on supporting structure 11 and encases the grounding and ground indicating circuitry 12. Input leads 13 and 14 of the device are coupled to a suitable external source of electrical potential 15 supplying a primary voltage of, for example, 117 volts AC (alternating current). This line voltage is applied to the primary winding 16 of a step down signaling transformer 17 preferably of the energy-limited type. One side 18 of transformer secondary winding 19 is connected to a diode rectifier 20. The other side 21 of transformer secondary winding 19 is grounded at 22 such as to housing 10.

The output of diode rectifier 20 is filtered through the network of series resistor 23 and parallel coupled capacitors 24 and 25 and reduced further to produce, for example, two volts direct current across resistor 26. A Wheatstone bridge 27 has one side thereof connected to the output of diode rectifier 20 through filter network resistor 23. The other side of Wheatstone bridge 27 is grounded at 22 with the other side 21 of transformer secondary 19.

Resistors 28, 29 and 30 of bridge 27 are preferably substantially equal in value and in the order of, for example, 100 ohms. The fourth arm of the bridge comprises a clamp 31 for attachment to a charged body 32 representing a tank truck or whatever to be grounded; the jaws 33 and 34 of the clamp serving to complete through charged body 32 a series electrical circuit through the two leads 35 and 36 of ground cable 37.

An extremely sensitive polarized relay 38 which will pull in at, say, one-half volt, is connected across the output of bridge 27 through leads 39 and 40. Such a relay typically has a direct current resistance in the order of 3.6K ohms, several orders of magnitude greater than the bridge resistances. With the ground clamp resistance $R_g$ equal to infinity (no ground established) the normal polarity of the relay is reversed keeping contact 41 open. Sensing relay 38 hence is not energized and the device indicates "no ground."

When a good ground is established, $R_g$ will be nearly 0. If the voltage drop across resistor 26 in the circuit is two volts, the voltage across resistor 28 will be one volt when $R_g$ is 0 and resistors 28 and 29 are of equal value, but the voltage across resistor 30 will be two volts. The voltage across relay 38 then becomes one volt of the proper polarity to close the relay. This causes relay 38 to close its contact 41 and energize relay 42. When relay 42 is energized, its normally closed contact 43 opens and its normally open contact 44 closes. Due to the coupling of relays 38 and 42 with the line voltage, when a sensory indicator light 47 is turned on indicating a "grounded" condition, the power-on monitoring light 48 is turned off. When as shown, lights are used to provide a sensory indication of a grounded condition, lens 49 covering the power monitoring light 48 might be colored to give a red light and lens 50 covering light 47 might be colored to give a green light, although this is of course a matter of choice and only incidental to this invention. Light 48 serves merely to indicate that the device is receiving power, a useful though non-essential sensory output. Light 47, on the other hand, provides the sensory output of the ground indicator to indicate a safe ground through clamp 31 and it or a functional equivalent is essential for practical use of the equipment.

Now, concerning operation of the circuit, at some value of $R_g$ greater than 0, sensing relay 38 will be energized. This is the maximum resistance path that the device will indicate a good ground. If sensing relay 38 will pull in at one-half volt and the voltage at the junction of resistors 28 and 29 in the bridge is one volt, the voltage at the junction of resistor 30 and clamp 31 (resistance $R_g$) must be plus one-half volt. The value of $R_g$ for this condition where resistors 28, 29 and 30 are all approximately 100 ohms is 33 ohms, assuming of course the voltage applied to the bridge is two volts. Under these conditions, any ground path exceeding 33 ohms will not be indicated as a ground. Actually, the threshold value of $R_g$ for indicating a good ground may be changed as desired within rather wide limits by the proper selection of component values establishing the voltage level applied to the bridge and by selecting bridge resistors of different resistance values.

By employing a step down transformer 17 which is of the energy-limiting type as preferred, the direct current steady state voltage and current at ground clamp 31 can be maintained well below a power level which might be considered hazardous. Also of importance to the utility of the device is the fact that the peak energy which may be dissipated by arcing at ground clamp 31 will be minimal due to the resistive network between the clamp and sensing relay 38 and capacitor 25. Further, when capacitor 25 is discharging, some of its energy will be used to charge relay 38 and vice versa. Therefore the absolute maximum stored energy in the entire circuit which might produce dangerous arcing at ground clamp 31 is typically well below the most conservative 30 microjoule ignition limit established by the U.S. Bureau of Mines for the safe use of equipment of the general type herein disclosed.

The ground indicator circuit described herein is not only capable of high resolution and sensitivity of ground threshold detection at ground resistances well below 100 ohms; it should also be pointed out in connection with the circuit operation that $R_g$ max can never exceed the resistance value of resistor 29 and still indicate a good ground for the polarity on sensing relay 38 will reverse, preventing any indication. Thus, an electrical safety interlock is provided which will prevent a false "safe" ground indication from the device should the polarized sensing relay, for any reason, change sensitivity.

While a single embodiment of the ground indicator has been shown and described herein, it should be understood that various alterations, modifications and substitutions may be made thereto without departing from the teachings of this invention as defined by the spirit and scope of the appended claims.

I claim:

1. A ground indicator device for electrically grounding a body subject to the build up of an electrical charge thereon comprising, a source of power, a step down transformer coupled thereto, a rectifier having one side thereof coupled to one side of the transformer secondary winding, a Wheatstone bridge having one side of its input coupled to the other side of said rectifier and the other side of the input of said Wheatstone bridge and said transformer secondary winding being grounded, body grounding means electrically interposed in one arm of said Wheatstone bridge and adapted for attachment to said body, direct current polarity sensitive switch means coupled across the output of the Wheatstone bridge for actuation in response to a bridge output signal of predetermined voltage and polarity, and output means responsive to actuation of said switch means for indicating the electrical resistance of the connection between said body and body grounding means is within safe limits.

2. A device as defined in claim 1 wherein the output means includes indicating means, and a power relay responsive to actuation of said switch means for coupling said indicating means to said source of power.

3. A ground indicator device for electrically grounding a body subject to the build up of an electrical charge thereon comprising, means for supplying a source of low voltage direct current energy, a Wheatstone bridge having its input coupled to said means, one side of said input being grounded, body grounding means electrically interposed in one arm of said Wheatstone bridge and adapted for attachment to said body, polarity sensitive switch means coupled across the Wheatstone bridge for actuation in response to application of a bridge output signal of predetermined voltage and polarity, and output means responsive to actuation of said switch means for indicating the electrical resistance of the connection between said body and body grounding means is within safe limits.

4. A device as defined in claim 3 wherein the output means includes indicating means, and a power relay responsive to actuation of said switch means for energizing said indicating means.

5. A device as defined in claim 4 wherein said indicating means includes a lamp light.

6. A ground indicator device for electrically grounding a body subject to the build up of an electrical charge thereon comprising, a housing, conductor means for coupling power into said housing, a step down transformer in said housing coupled to said conductor means, a rectifier in said housing having one side thereof coupled to one side of the transformer secondary winding, a Wheatstone bridge having one side of its input coupled to the other side of said rectifier within said housing, the other side of the input of said Wheatstone bridge and transformer secondary winding being grounded, external clamp means electrically interposed in one arm of said Wheatstone bridge through said housing and adapted for grounding attachment to said body, a polarity sensitive relay coupled across the Wheatstone bridge within said housing for actuation in response to a bridge output signal of predetermined voltage and polarity, a power relay within said housing responsive to actuation of said polarity sensitive relay to complete a circuit through said conductor means for energizing the power relay, and output means selectively connected to said conductor means by said power relay to indicate a safe ground connection between said body and clamp means.

References Cited

UNITED STATES PATENTS 2,827,624   3/1958   Klein _____ 340—233
3,040,211   6/1962   Caldwell _____ 340—255 X NEIL C. READ, *Primary Examiner.*

D. MYER, *Assistant Examiner.*